United States Patent [19]

McLean et al.

[11] 4,239,821
[45] Dec. 16, 1980

[54] APPARATUS FOR AND METHOD OF COATING A WEAR LAYER OF A CARPETING STRIP WITH CURABLE LATEX FOAM

[75] Inventors: Michael E. McLean; Rufus N. Ensley, both of Waynesville; Doyle V. Haren, Clyde, all of N.C.; Anthony J. Alcaraz, Petersburg, Va.

[73] Assignee: Dayco Corporation, Dayton, Ohio

[21] Appl. No.: 28,784

[22] Filed: Apr. 10, 1979

[51] Int. Cl.³ .................. B32B 3/00; B05D 3/12; B05D 3/02; B05C 3/02
[52] U.S. Cl. .................. 427/358; 118/407; 118/413; 118/415; 156/72; 156/157; 427/373; 427/389.9; 428/40; 428/45; 428/58; 428/62; 428/82; 428/88; 428/95; 428/192; 428/193; 428/194
[58] Field of Search .................. 156/72, 157; 427/244, 427/358, 373, 389.9; 428/40, 45, 58, 62, 82, 88, 95, 192, 193, 194; 118/407, 413, 415

[56] References Cited

U.S. PATENT DOCUMENTS

| 4,086,377 | 4/1978 | Barchi | 427/358 |
| 4,092,450 | 5/1978 | Haren | 428/62 X |
| 4,109,034 | 8/1978 | Welch | 427/358 X |

FOREIGN PATENT DOCUMENTS

| 294996 | 5/1967 | Australia. | |
| 825166 | 11/1951 | Fed. Rep. of Germany | 118/415 |

Primary Examiner—Michael R. Lusignan
Attorney, Agent, or Firm—Charles E. Bricker; Reuben Wolk

[57] ABSTRACT

An apparatus and method for continuously coating a bottom surface of a wear layer of a carpeting strip with latex foam during continuous manufacture of the carpeting strip and wherein such latex foam is cured to define a compressible backing material for the wear layer of such carpeting strip.

20 Claims, 7 Drawing Figures

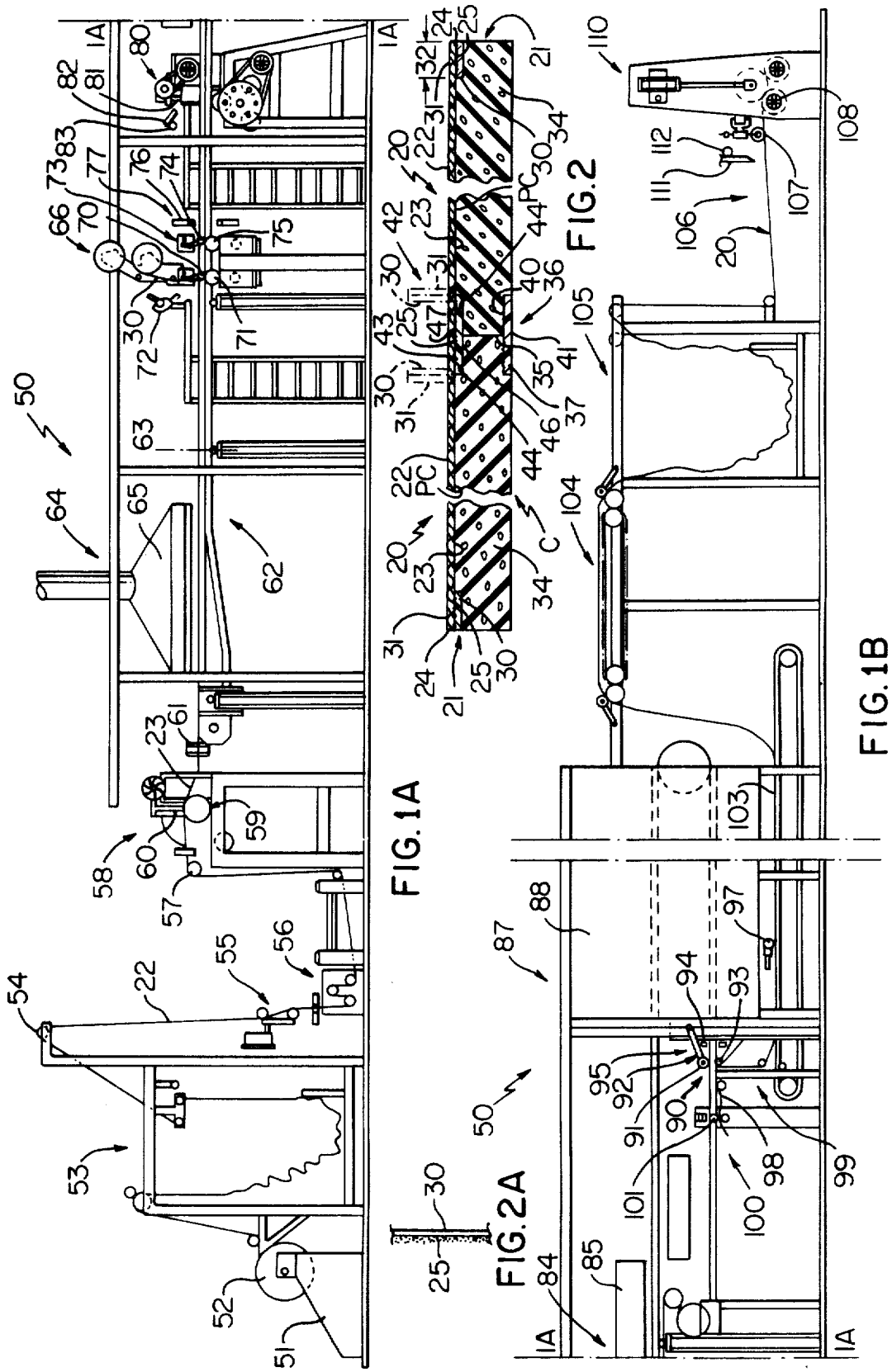

APPARATUS FOR AND METHOD OF COATING A WEAR LAYER OF A CARPETING STRIP WITH CURABLE LATEX FOAM

CROSS-REFERENCE TO RELATED APPLICATION

This invention is related to copending U.S. Pat. Application Ser. No. 028,787, filed concurrently herewith.

BACKGROUND OF THE INVENTION

1. Field of the Invention

This invention relates to carpeting strips each comprised of a wear layer bonded against a compressible resilient backing material made of a latex foam and in particular to a coating apparatus for continuously coating latex foam on the wear layer to define the compressible backing material.

2. Prior Art Statement

It is known in the art to provide carpeting strips of the character mentioned and as disclosed in U.S. Pat. No. 4,092,450. However, to provide a commercially competitive carpeting strip of the character disclosed in this patent, it is necessary that such a strip be produced in a continuous manner with minimum scrap and with optimum utilization of production devices and techniques to assure continuous uninterrupted production.

In making such a carpeting strip it is known to continuously move a wear layer having a bottom surface in a rectilinear path and continuously coat the bottom surface with a thickness of latex foam during such continuous movement employing a coating apparatus comprising a coating knife supported in spaced relation at a fixed position above the bottom surface to define a controlled thickness of the latex foam. However, with such a coating knife it is necessary to stop the production process at periodic intervals, generally after operating about ten minutes to clean dried latex foam accumulated on the coating knife.

SUMMARY

It is a feature of this invention to provide a coating apparatus for continuously coating the bottom surface of a wear layer of a carpeting strip with latex foam during continuous movement of the wear layer with the coating apparatus comprising a coating knife supported in spaced relation at a fixed position above the bottom surface to define a controlled thickness of the latex foam and wherein such coating apparatus comprises a foam engaging portion on the knife which is replaceable while continuously using the knife to define the controlled thickness of the foam.

Another feature of this invention is to provide a coating apparatus of the character mentioned in which the foam engaging portion is a polymeric film.

Another feature of this invention is to provide a coating apparatus of the character mentioned and further comprising a device for providing predetermined lengths of the polymeric film in position around the coating knife as a movable cover to define the knife as a self-cleaning knife.

Another feature of this invention is to provide a coating apparatus of the character mentioned in which the device comprises a supply roll for the film supported for unwinding rotation adjacent the knife, a wind-up roll for the film supported for rotation adjacent the supply roll, and means for removing wrinkles in the film and assuring the foam-engaging portion of the film conforms closely to the configuration of the knife.

Another feature of this invention is to provide a coating apparatus of the character mentioned in which the supply roll of the film comprises a supply roll of a film of synthetic plastic.

Another feature of this invention is to provide a coating apparatus of the character mentioned in which the device for providing the polymeric film includes brake means for the supply roll and a ratchet system for the wind-up roll to enable the film to be provided around the knife under predetermined tension while assuring such film cannot be unwound from the wind-up roll once wound thereon.

Another feature of this invention is to provide a method of coating latex foam on a wear layer of a carpeting strip employing a self-cleaning coating knife.

Another feature of this invention is to provide a method of the character mentioned in which the self-cleaning action of the coating knife is provided by a film of the polymeric material.

Another feature of this invention is to provide a self-cleaning portion of the coating knife by employing a polymeric film which is movable while continuously using the coating knife to thereby define such coating knife as a self-cleaning knife.

Therefore, it is an object of this invention to provide an improved apparatus and method having one or more of the features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIGS. 1A and 1B present a view in elevation of an apparatus and method with FIG. 1B being an extension of FIG. 1A upon superimposing the line 1A—1A of FIG. 1B on the line 1A—1A of FIG. 1A, and wherein such apparatus and method are employed in making a carpeting strip in which the apparatus and method of this invention are used;

FIG. 2 is a view, not drawn to scale, with parts in cross-section and parts broken away illustrating a pair of carpeting strips made by the apparatus and method of FIGS. 1A and 1B joined together to define a high strength substantially invisible joint therebetween;

FIG. 2A is an enlarged fragmentary side view particularly showing adhesive material on release tape comprising the carpeting strip of FIG. 2;

Figure 3:
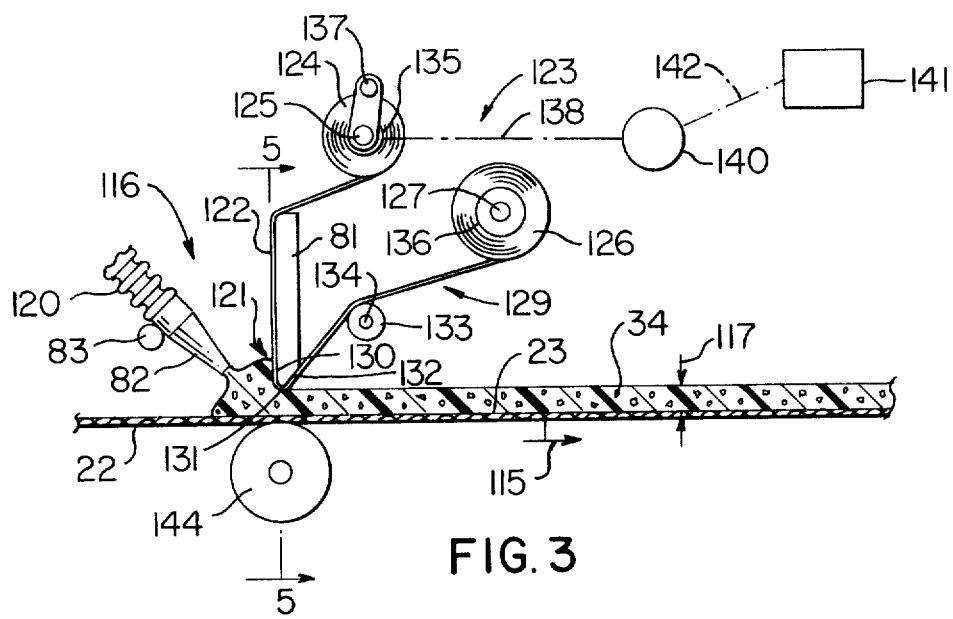
FIG. 3 is a primarily schematic view in elevation particularly illustrating components at a foam applying station of the apparatus and method of FIGS. 1A and 1B which are employed in applying latex foam which defines a compressible resilient foam backing material of the carpeting strip of FIG. 2.

DESCRIPTION OF EXEMPLARY CARPETING STRIP AND CARPET MADE USING APPARATUS AND METHOD OF THIS INVENTION

An exemplary carpeting strip of the type disclosed herein is presented in the previously mentioned U.S. Pat. No. 4,092,450, and the disclosure of this patent is incorporated herein by reference thereto. However, in order to produce such a carpeting strip economically and with sufficient manufacturing precision to enable a typical non-professional carpet installer to install such carpeting strip and still provide a professional quality installation the improved apparatus and method illustrated in FIGS. 1A and 1B are preferably employed.

Reference is now made to FIG. 2 of the drawing which illustrates two portions of identical carpeting strips 20 (with their center portions broken away) made employing the apparatus and method of FIGS. 1A and 1B and with associated side edges in adjoining relation to define an overall carpet designated generally by the reference letter C. Each carpeting strip 20 has integral means on opposite side edges thereof and each designated generally by the reference numeral 21 for defining a substantially invisible seam between strip 20 and a substantially identical strip. Each carpeting strip 20 comprises a wear layer 22 having a bottom or inside surface 23 and such wear layer has opposed side edges each designated by the same reference numeral 24. An adhesive material in the form of a strip-like band or coating 25 is provided on the bottom surface 23 adjacent each side portion of the strip 20 and such coating is indicated by stipling in the form of spaced dots. The adhesive 25 may be in the form of adhesive material applied directly against the bottom surface 23 and protected with release tape which is free of adhesive, a comparatively thin so-called double-adhesive back tape protected on its surface away from surface 23 with release tape, adhesive material initially provided as a layer on a release tape and which remains adhered to the surface 23 upon removal of the release tape, or any suitable similar material whereby such release tape is designated by the reference numeral 30. The release tape 30 at each side portion of strip 20 enables the carpeting strip to be manufactured while defining a free part 31 of the wear layer 22 along its length and such free part 31 has a width 32 defined by the width of release tape 30 associated therewith.

The release tape 30 of this example of the invention has one surface thereof provided with a meltable adhesive 25 thereon (FIG. 2A) and such adhesive is disposed against the inside surface 23 of the wear layer 22 and serves to hold the tape 30 firmly in position. The meltable adhesive 25 on the release tape 30 is activated by heating thereof so that it will adhere to the inside surface of the wear layer 22 and such adhesive 25 remains on the wear layer 22 once the tape 30 is removed whereupon the adhesive 25 is then used in joining carpeting strips 20 to define the carpet C as will be described in more detail subsequently.

The carpeting strip 20 has a compressible polymeric sponge-like or foam-like backing material 34 bonded against its wear layer 22 and in particular, against surface 23 of such wear layer except at locations covered by the release tape. The release tape 30 at each side of strip 20 is, in essence, a dual-purpose tape which serves to isolate and maintain adhesive 25 ready for use by providing a freshly exposed adhesive surface upon exposing such adhesive 25 by removal of the tape 30 as well as isolating a width portion of the compressible backing material 34 from the wear layer 22 upon integrally forming the backing material 34 against the tape 30. Each tape 30 defines the above-mentioned free part 31 of the wear layer 22 for a purpose now to be described.

In particular, to install a pair of carpeting strips 20 in adjoining relation to define a carpet C as illustrated in FIG. 2, a pair of carpeting strips 20 are placed with associated edges 35 in abutting relation as shown at 36 in FIG. 2. If desired, a suitable so-called double-adhesive-back tape 37 may be used to fasten the bottom surfaces of the backing material 34 immediately adjacent edges 35 against an associated supporting floor (not shown) by adhering one surface 40 of the tape 37 to the compressible backing material 34 and the other surface 41 of such tape to such supporting floor, or the like. The tape 37 also serves to hold the edges 35 against movement during the seaming operation whereby the edges 35 are fastened together so as to define a substantially invisible seam therebetween as will now be described.

In particular, the free portions 31 of the wear layers 22 of carpeting strips 20 with their release tapes 30 adhered are lifted substantially vertically as indicated by dotted lines at 42 in FIG. 2. With the free portions 31 thus lifted, suitable support means 43 (of any type known in the art) is bonded against what will be referred to as isolated portions 44 of the backing material 34. The isolated portions 44 referred to are defined by associated release tapes 30. The support means 43 in this example comprises double-adhesive-back-tape with the bottom surface 46 of tape 43 being bonded against the isolated portions 44. At this point, the release tape 30 is removed from one of the carpeting strips 20 to provide freshly exposed adhesive 25 whereupon the free portion 31 is adhered against the top adhesive surface 47 of the tape 43. A similar procedure is followed with the free portion 31 of the wear layer 22 of the other carpeting strip 20 whereby the top surfaces of the free parts 31 are disposed in substantially coplanar relation while defining a substantially invisible junction or seam between adjoining side edges of the carpeting strips 20.

It will be appreciated that this entire operation of joining side edges of a pair of carpeting strips 20 may be achieved without requiring special tools and while employing precision factory cut edges to define a substantially invisible seam between carpeting strips. It will also be appreciated that instead of tape 43 any other suitable support means known in the art may be used to bridge between and join side edge portions of a pair of carpeting strips 20.

DESCRIPTION OF THE OVERALL APPARATUS AND METHOD FOR CONTINUOUSLY PRODUCING A CARPETING STRIP

Having described the carpeting strip 20 and a typical carpet C defined using a pair of such strips, the detailed description will now proceed with an apparatus and method which may be used to make such a carpeting strip and such apparatus and method is illustrated in FIGS. 1A and 1B and designated generally by the reference numeral 50. The apparatus 50 comprises a so-called let-off device 51 which supports a supply roll 52 of a suitable wear layer defining material which is preferably in the form of a fabric and such fabric wear layer will be designated by the same reference numeral 22 as in the completed carpeting strip 20. The supply roll 50 is supported by device 51 for controlled unwinding rotation and the fabric wear layer 22 is fed through a so-called J-box fabric accumulator assembly 53 which may be of any suitable type known in the art for purposes known in the art.

The fabric wear layer 22 is moved around a turn roll 54 and fed vertically downwardly through a floating roll steering guide assembly 55 which serves to align such wear layer for subsequent operations. The wear layer 22 is then moved through an adjustable fabric tension control assembly 56 which in this example is in the form of a three roll assembly. The assembly 56 provides a controlled constant tension on the wear layer enabling processing thereof in a continuous manner.

The tensioned wear layer 22 is continued over an expander roll 57 which may be a bowed roll which spreads or opens up spaces between yarns or filaments of the fabric for coating purposes. The wear layer then continues to a precoat station 58 of the apparatus 50. At station 58 a so-called knife over roll coater 59 having a suitable knife or doctor blade 60 associated therewith is used to apply a suitable polymeric precoat PC (FIG. 2) between release tapes 30 on the inside surface 23 of the wear layer 22. The precoat PC seals the interstices in the wear layer 22, promotes adhesion of polymeric material defining the backing material 34 to be coated thereagainst, the controls the feel or hand of the wear layer 22.

As the wear layer 22 exits the precoating station 58 and continues through the apparatus 50, photoelectric detector devices 61 are provided and sense opposite side edges thereof and provide appropriate signals which are used to make adjustments in the apparatus 50 which assure precision guiding of the opposed fabric edges into the fabric stretching or swing section of a tenter assembly 62. The opposed edge portions of the fabric wear layer 22 are attached to tenter pins, not shown, by urging the fabric so that such pins extend therethrough.

The tenter assembly 62 serves to initially gradually stretch the wear layer in its swing section to a predetermined precise width shown basically at location 63 which commences what will be referred to as a constant width section of the tenter assembly. During the time that the wear layer 22 is placed on the tenter pins and stretched to a constant width the precoat applied at the precoat station 58 is dried at a precoat drying station 64 by a heater 65 which may be of any suitable type and in this example is the form of an electrical infrared heater.

The wear layer 22 then continues to a taping station 66 where release tape 30 is applied to the inside or normally concealed surface 23 (concealed in the completed carpeting strip 20) of the wear layer at spaced apart locations on opposite side portions of such wear layer employing a pair of taping devices each at an associated side portion of the wear layer 22 with each taping device having a tape-applying roller 70. During application of each release tape 30 the tape is supported by backup means in the form of a backup roll 71 associated with each tape applying roller 70. As indicated earlier, the release tape 30 is of the type which has adhesive 25 thereon and such adhesive is heat activated immediately prior to application of the tape 30 against the wear layer 22. In this example the heat activation is provided by a hot air blower 72 associated with each tape 30 and the blower 72 has a hot air discharge nozzle. The adhesive 25 remains on the inside surface 23 of the wear layer 22 after removal of the tape 30 as previously mentioned.

The apparatus and method 50 employ a tape bonding station 73 where a pressure roller 74 is employed in cooperation with a backup roller 75. The action of the rollers 74-75 at station 73 assures that the tape 30 applied at the taping station 66 is urged more tightly against the inside surface 23 of the wear layer 22 whereby the final carpeting strip 20 is assured of having the required release tape 30.

The apparatus and method 50 also employ a photoelectric device 76 in association with each tape 30 at uncovered release tape detection station 77 to detect the presence of such tape at each side portion of the wear layer 22. In the event tape 30 is not present on either side portion of such wear layer 22, for any reason, a suitable alarm or signal is provided to indicate the absence of release tape 30 and thereby allow appropriate corrective action to be taken.

The wear layer 22 with release tape 30 adhered to its opposite side portions is then introduced through a backing cushion applying station or foam applying station 80 where a suitable thickness of compressible yet resilient backing material is applied thereon and such material may be in the form of sponge-like rubber, or any suitable latex foam and preferably is in the form of a no-gel foam, i.e., such foam being free of added chemical gelling agents. The backing material 34 is shown in its completed and cured condition in the final carpet C in FIG. 2.

In one exemplary embodiment of a carpeting strip 20 the latex foam cushion 34 was made utilizing a rubber foam latex such as styrene-butadiene rubber. Foam latex is applied at station 80 preferably employing a doctor blade or knife to control the thickness of the foam. In this example a doctor blade 81 is used in spaced relation above wear layer 22 and foam defining the foam cushion 34 is conveyed through a nozzle 82 which is reciprocated across the width of the wear layer 22 and cooperates with the doctor blade 81 to provide a controlled height of the latex foam. Suitable means indicated schematically by a circle 83 may be provided for moving the nozzle 82 in a reciprocating manner across the wear layer and such means 83 may be provided with suitable automatic or semi-automatic controls.

The foam material defining the latex foam cushion 34 is suitably gelled on wear layer 22 at a foam gelling station 84 employing a heating apparatus which in this example is in the form of an oven or lamp assembly 85, FIG. 1B, as it exits the foam applying station 80. The gelling apparatus 85 of this example consists of a plurality of electric heat lamps which serve to stabilize the latex foam cushion for further processing.

The carpet construction defined by wear layer 22 with release tape 30 extending along opposite side edge portions thereof and with the latex foam cushion bonded thereagainst, thereby concealing the tapes 30, is then passed through a drying and curing station 87 for drying and curing purposes. At station 87 an oven 88 of any suitable type known in the art may be employed and may comprise gas fired heaters, electric heaters, or other suitable heating means. The carpet construction of this example makes a plurality of passes through the oven 88 to complete the drying and curing thereof.

The dried and cured carpeting strip 20 with tape 30 along its opposite side portions is introduced into a carpeting strip trimming station 90 immediately after inspection for the presence of covered or concealed release tape 30 as will be described subsequently. At the trimming station 90 a pair of rotary slitters or cutters 91 comprising a cutting apparatus 92 are used to cut the carpeting strip and define a corresponding pair of trimmed strips or ribbons of scrap material which are removed from the apparatus 50 in a manner to be described subsequently. The cutters 91 associating with the two release tapes are precisely controlled and the width of the tapes is such that splitting is achieved so as to define a completed carpeting strip 20 having a precision width while still defining cut tape edges along the full length of the carpeting strip.

The rotary cutters 91 are suitably supported on the cutting apparatus 92 to assure that the carpeting strip 20 is of a precision width and further assure that the width of each release tape 30 remaining with the carpeting strip 20 is sufficient to enable joining of two strips 20 in the manner previously described. Usually three-quarters of an inch of release tape along each side strip 20 is sufficient to define a high strength joint. The cutting apparatus 92 at the cutting station 90 includes a pair of backup rollers 93 each associated with a rotary cutter 91.

The apparatus 50 has a covered or concealed release tape detection station 95 upstream of the trimming station as mentioned earlier where a pair of photoelectric devices 94 are provided and each operatively associates with a cutter 91 enabling the rotary cutters 91 to be adjusted and set for cutting purposes to provide the required width of release tape as well as define the carpeting strip 20 having edges 35 which are factory cut precision edge. The photoelectric device 94 also operatively associates with a marking mechanism 97 comprising the apparatus 50 which operates to continuously mark the foam backing layer 34 with the manufacturers identifying data and or advertising as long as the apparatus 50 is operating satisfactorily. However, if the release tape 30 associated with a particular photoelectric device 94 is either of insufficient width or not present the marking mechanism is suitably automatically operated to cease its marking action. This procedure allows inspection downstream of the mechanism, visually or by other means, whereby a length of carpeting strip, which is defective because it does not have the required width of release tape at each side portion thereof or such tape is not present, may be cut away.

After trimming or cutting the carpeting strip at cutting station 90 a pair of scrap strips or ribbons 98 of trimmed material remain on the tenter pins. The ribbons 98 are conveyed to a trim removal station 100 which employs a trim removal apparatus 101 which operates with associated apparatus to pull the strips 98 from the tenter pins of the tenter assembly whereupon the pulled strips are scrapped.

The trimmed carpeting strip 20 with the correct width of release tape 30 fixed to its opposite side portions is then conveyed vertically downwardly from the backup rollers 93 as shown at 99 and then horizontally beneath the oven 88 as shown at 103 for cooling purposes. The completed carpeting strip is then moved upwardly and over a horizontal section 104 and fed through a conventional J-box accumulator 105 for build up of a quantity of carpeting strip 20 for windup purposes.

The carpeting strip 20 is inspected at an inspection station 106 and predetermined lengths thereof are measured by a length gage 107 and suitably wound to define a supply roll 108 of carpeting strip 20 at a windup station 110. A cutting device indicated schematically by a fragmentary cutting blade 111 is employed to cut the strip 20 across its width once a predetermined length thereof has been wound to define a roll 108. The blade 111 may be reciprocated across the apparatus 50 by a suitable device 112 which is indicated schematically by a circle.

Suitable edge sensing means is provided at station 110 to assure windup of roll 108 in a smooth manner. After windup, the completed roll of carpeting strip 20 is then suitably packaged, either in a carton or wrapped in a protective covering such as a protective plastic film and removed from the windup station 110 employing suitable mechanism such as a fork lift truck, or the like, for storage and/or shipment.

The release tape 30 used in the carpeting strip may be made of paper, plastic or other polymeric material, or any suitable material which is capable of having adhesive material 25 provided thereon and which is capable of being bonded to the inside surface 23 of the wear layer 22. Further, the construction of the release tape 30 is such that once it is removed from its carpeting strip to install same to define a carpet C, the adhesive material 25 originally protected by the tape, remains on the layer 22 and being freshly exposed provides maximum adhesive capabilities.

It will also be appreciated that other apparatus and techniques may be used in the apparatus 50. For example, a bed plate or similar support structure may be used instead of a support roll at the foam applying station 80. In addition, other means such as mechanical height measurement means may be employed at the uncovered release tape detection station 77 to measure the presence of release tape immediately after application thereof instead of using photoelectric devices. In addition, it will also be appreciated that instead of rotary knives at the trimming station 90 other slitting methods and apparatus may be employed, such as laser devices, water jets, shear cut knives, score cut knives, and the like.

For an understanding of this invention only the above general description of the overall apparatus and method 50 has been presented; however, if a more detailed understanding of certain components or subsystems of the apparatus and method 50 is desired reference may be made to the above cross-referenced United States application Ser. No. 28,787 which is incorporated herein by reference thereto.

THE FOAM APPLYING STATION

The overall apparatus 50 has means, including the previously described tentor assembly 62, for continuously moving the carpeting strip and hence the wear layer 22 thereof as previously described and such moving means will be designated schematically by an arrow 115 in FIG. 3; and, the moving means 115 also supports the wear layer 22 so that its bottom surface 23 faces upwardly as viewed in FIG. 3. The apparatus 50 also comprises a coating apparatus which is designated generally by the reference numeral 116 and such coating apparatus is provided for continuously coating the bottom surface 23 with a controlled thickness of latex foam, which is designated generally by the reference numeral 117, and during continuous movement of the wear layer 22.

The coating apparatus 116 comprises the previously mentioned doctor blade 81, which is also referred to herein as coating knife 81, and such knife is supported in spaced relation at a fixed position above the bottom surface 23 to define the controlled thickness of the latex foam. As previously mentioned, the foam 34 is applied using a conduit or nozzle 82 which continuously provides the latex foam 34 therethrough and the nozzle 82 is operatively connected to a flexible conduit 120 which allows the nozzle 82 to be moved by the previously mentioned moving means 83 in a reciprocating manner back and forth across the wear layer.

Figure 4:
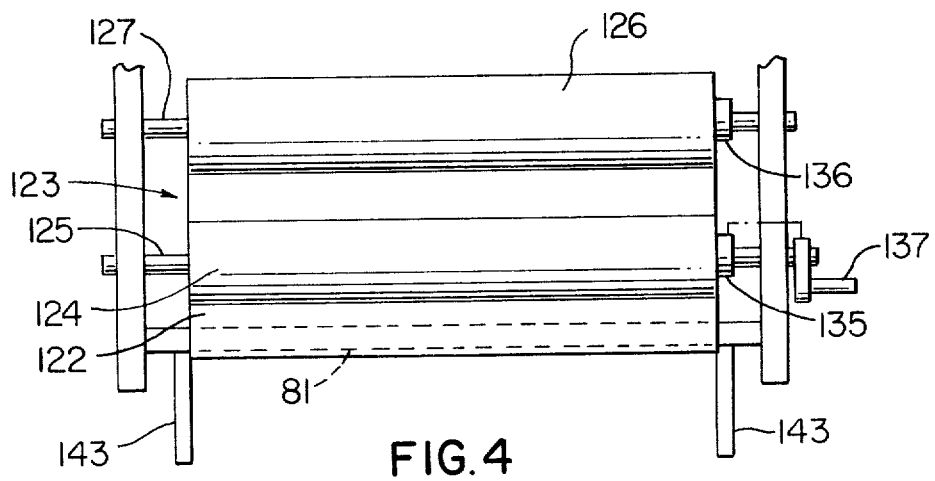
FIG. 4 is a top plan view of the components illustrated in FIG. 3.

The coating apparatus 116 comprises a foam-engaging portion shown at 121 on the knife 81 with such foam-engaging portion being replaceable while continuously using the knife to define the controlled thickness 117 of foam 34. The foam-engaging portion of the knife 81 is preferably in the form of a suitable movable film which in this example of the invention is a polymeric film 122; and, a device (FIGS. 3-4) designated generally by the reference numeral 123 is provided for positioning predetermined lengths of the polymeric film to define the knife 81 as a self-cleaning knife.

The device 123 comprises a wind-up roll 124 for film which is supported for rotation on a shaft 125 adjacent the knife 81. The device 123 also comprises a supply roll 126 which provides the film 122 and supports same for unwinding rotation on a shaft 127 adjacent the knife 81 and adjacent the windup roll 124. The device 123 also has means 129 for removing wrinkles in the film 122 and assuring that the foam-engaging portion of the film conforms closely to the configuration of the knife 81 and in particular to the lower front surface 130, bottom edge 131 and tapered rear surface 132 of such knife.

The means 129 for removing wrinkles in film 122 comprises a freely rotatable roller 133 which is supported on a shaft 134 and such means also includes the disposal or arrangement of the shafts 125, 127, and 134. In particular, the shaft 125 is disposed above and downstream of knife surface 130; and, the shaft 127 is disposed downstream of shaft 125. Similarly, the shaft 134 is supported at a fixed position closely adjacent and downstream of the vertically disposed knife 81 above the bottom edge 131. With this arrangement of components, the film 122 is unwound and moves downwardly from its supply roll 126 around the wrinkle-removing roller 133, along the inclined surface 132, across the bottom edge 131, and vertically upwardly along the front surface 130 of the knife 81 so as to provide a path of movement for the film 122 which assures that the film 122 closely conforms to the knife contour upon tightening of such film. It will also be noted that the film 122 moves in a direction which is opposite the direction of movement of the wear layer 22.

To assure that the film is maintained in a tight condition the supply roll 126 is provided with a suitable braking device 136 and the wind-up roll 124 has a ratchet mechanism 135 which controls the wind-up rotation of the wind-up roll 124 while preventing unwinding rotation. The braking device 136 and ratchet mechanism 135 cooperate to yieldingly tension the film 122 with the desired tension and to maintain such tension on the film.

The ratchet mechanism 135 may be of any suitable type known in the art and such ratchet mechanism may be operated manually by handle 137. The ratchet mechanism 135 may also be operated automatically through a mechanical connection, shown schematically by dot-dash line 138, which is operatively connected to an electric motor 140. The motor is preferably operated continuously at a very slow speed of a few inches per minute to provide a new or fresh increment of film 122 in position to define the foam engaging portion 121 of the knife 81. The motor 140 may also be operatively connected to a timing and control mechanism 141 through a suitable control connection 142 so that at predetermined time intervals, determined by experience and use of the overall coating apparatus 116, a new or fresh increment of film 122 is moved in position to define the foam engaging portion 121 of the knife 81. However, regardless of whether a fresh increment of film is moved in position slowly and continuously or continuously in an indexing manner at predetermined time intervals, the motor 140, in essence, assures the provision of an automatically operated self-cleaning coating knife 81.

The film 122 which defines the film engaging portion of the knife 81 is preferably a polymeric film made of a synthetic plastic material and although a film of any suitable thickness may be employed for this purpose a polyethylene film having a thickness generally of the order of 8 mils and greater has been used satisfactorily. Further, in order to prevent unnecessary stress concentrations on the film 122 as it is moved along the inclined surface 132, edge 131, and front surface 130 the edge 131 is an arcuate surface of generous radius between surfaces 132 and 130 and sharp corners are avoided at all locations along the knife engaged by the film 122.

Figure 5:
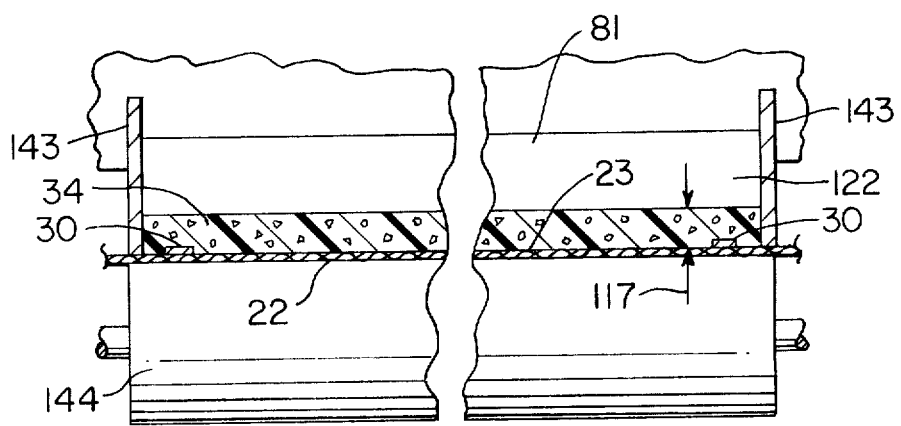
FIG. 5 is a view with the central part broken away taken essentially on the line 5-5 of FIG. 3.

The device 123 of this invention may be readily provided on production lines which utilize so-called doctor blades or coating knives of the type presented herein. Further, to assure that the thickness of latex foam which is applied on the wear layer is controlled with precision a pair of edge dams 143 are used on opposite sides of the device 123 as shown in FIG. 5. Further, in this example of the invention a support roll 144 is employed to support the wear layer 22 and foam during coating.

Once the wind-up roll 124 is completely filled with film that has been moved around the coating knife 81, the film is discarded. Also, once the supply roll 126 of film is exhausted with its film 122 having moved around the coating knife and wound on the wind-up roll 124, the supply roll 126 is removed and a new supply roll is installed on the shaft 127. The film 122 from a new supply roll is moved along the surfaces 132, 131, and 130 and attached to a core portion of an empty wind-up roll 124 whereupon the coating operation may continue until the supply roll is again exhausted.

In this disclosure of the invention sources of power such as electrical power, and the like, for the various components have not been illustrated and described however, it is to be understood that such power sources may be provided employing any suitable means known in the art. It will also be appreciated that the supports and mechanical drives defining the overall moving means of the apparatus 50 and the various components of such apparatus have also not been illustrated and described herein in detail except for the schematic designation of support and moving means by the arrow 115; and, it is to be understood that any suitable means known in the art may be used to define such moving means.

While present exemplary embodiments of this invention, and methods of practicing the same, have been illustrated and described, it will be recognized that this invention may be otherwise variously embodied and practiced within the scope of the following claims.

What is claimed is:

1. In an apparatus for continuously making carpeting strip comprising; means for continuously moving a wear layer having a bottom surface in a rectilinear path; a coating apparatus for continuously coating said bottom surface with a thickness of latex foam during continuous movement of said wear layer; said coating apparatus comprising a coating knife supported in spaced relation at a fixed position above said bottom surface to define a controlled thickness of said latex from and a conduit continuously providing said latex foam upstream of said knife during continuous movement of said wear layer; and a curing apparatus for curing said latex foam to define a compressible backing material for said wear layer of said carpeting strip; the improvement in said coating apparatus comprising a foam engaging portion on said knife which is replaceable while continuously using said knife to define said controlled thickness of foam.

2. A coating apparatus as set forth in claim 1 in which said foam engaging portion is a polymeric film.

3. A coating apparatus as set forth in claim 2 and further comprising a device for providing predetermined lengths of said polymeric film in position to define said foam engaging portion as a movable cover and said knife as a self-cleaning knife.

4. A coating apparatus as set forth in claim 3 in which said device comprises a supply roll of said film supported for unwinding rotation adjacent said knife, a wind-up roll for said film supported for rotation adjacent said supply roll, and means for removing wrinkles on said film and assuring said foam-engaging portion of said film conforms closely to the configuration of said knife.

5. A coating apparatus as set forth in claim 4 in which said means for removing wrinkles comprises a freely rotatable roller supported adjacent said knife in spaced relation above a bottom edge thereof.

6. A coating apparatus as set forth in claim 4 in which said supply roll of said film comprises a supply roll of film having a thickness generally of the order of 8 mils and greater.

7. A coating apparatus as set forth in claim 6 in which said supply roll of film comprises a supply roll of polyethylene film.

8. A coating apparatus as set forth in claim 4 and further comprising brake means on said supply roll to enable controlled unwinding thereof under tension.

9. A coating apparatus as set forth in claim 8 and further comprising a ratchet assembly on said wind-up roll for winding film from said supply roll under tension while preventing unwinding rotation of said wind-up roll.

10. A coating apparatus as set forth in claim 1 and further comprising a pair of edge dams on opposite sides of said knife which confine said latex foam therebetween.

11. In an apparatus for continuously making carpeting strip having integral joining means; said apparatus comprising means for continuously moving a wear layer having a bottom surface and opposed side edge portions in a rectilinear path; a pair of devices for fixing a pair of release tapes against said bottom surface; each of said devices fixing its release tape adjacent an associated side edge portion of said wear layer; a coating apparatus for continuously coating said bottom surface and said tapes with a thickness of latex foam during continuous movement of said wear layer; said coating apparatus comprising a coating knife supported in spaced relation at a fixed position above said bottom surface to define a controlled thickness of said latex foam and a conduit continuously providing said latex foam upstream of said knife during continuous movement of said wear layer; said coating apparatus coating said tapes so that each of said tapes isolates a portion of said latex foam from said wear layer and is sandwiched therebetween; and a curing apparatus for curing said latex foam to define a compressible backing material for said wear layer of said carpeting strip; each of said tapes being removable and serving to isolate adhesive comprising said integral joining means; the improvement in said coating apparatus comprising a foam engaging portion on said knife which is replaceable while continuously using said knife to define said controlled thickness of foam.

12. A coating apparatus as set forth in claim 11 in which said foam engaging portion is a polymeric film.

13. A coating apparatus as set forth in claim 12 and further comprising a device for providing predetermined lengths of said polymeric film in position to define said foam engaging porton as a movable cover and said knife as a self-cleaning knife.

14. A coating apparatus as set forth in claim 13 in which said device for providing predetermined lengths comprises a supply roll of said film supported for unwinding rotation adjacent said knife, a wind-up roll for said film supported for rotation adjacent said supply roll, and means for removing wrinkles on said film and assuring said foam-engaging portion of said film conforms closely to the configuration of said knife.

15. In a method of continuously making carpeting strip comprising; continuously moving a wear layer having a bottom surface in a rectilinear path; continuously coating said bottom surface with a thickness of latex foam during continuous movement of said wear layer; and continuously coating step comprising supporting a coating knife in spaced relation at a fixed position above said bottom surface to define a controlled thickness of said latex foam and continuously providing said latex foam through a nozzle upstream of said knife during continuous movement of said wear layer; and curing said latex foam to define a compressible backing material for said wear layer of said carpeting strip; the improvement in said method wherein said continuously coating step comprises replacing a foam engaging portion of said knife while continuously using said knife to define said controlled thickness of foam.

16. A method as set forth in claim 15 in which said replacing step comprises defining said foam engaging portion as a polymeric film.

17. A method as set forth in claim 16 in which said replacing step comprises providing predetermined lengths of said polymeric film in position against said knife to define said foam engaging portion as a movable cover and said knife as a self-cleaning knife.

18. A method as set forth in claim 17 in which said providing step comprises supporting a supply roll of said film for unwinding rotation adjacent said knife, supporting a wind-up roll for said film for rotation adjacent said supply roll, and wrapping said film around said knife so as to define said foam-engaging portion of said film against the lower portion of said knife.

19. A method as set forth in claim 18 in which said wrapping step comprises removing wrinkles on said film.

20. A method as set forth in claim 18 in which said wrapping step comprises wrapping said film against said lower portion while subjecting said film to tensile forces.

* * * * *